POWER SUPPLY SYSTEM FOR PORTABLE TELEVISION RECEIVER

Filed Nov. 13, 1967 2 Sheets-Sheet 1

INVENTOR.
R. Joseph Ludlam
BY
Richard E. Bee
ATTORNEY

United States Patent Office 3,521,142

Patented July 21, 1970

3,521,142
POWER SUPPLY SYSTEM FOR PORTABLE TELEVISION RECEIVER

R. Joseph Ludlam, Benton Harbor, Mich., assignor to Heath Company, St. Joseph, Mich., a corporation of Delaware Filed Nov. 13, 1967, Ser. No. 682,486
Int. Cl. H02j 9/00
U.S. Cl. 320—39 2 Claims

ABSTRACT OF THE DISCLOSURE

A power supply system for a portable television receiver whereby the receiver may be operated from (1) an alternating-current power line, (2) a detachable battery pack accessory or (3) a separate battery such as an automobile battery. The television receiver includes the usual rectifier circuit for operation from an alternating-current power line together with two multicontact switch assemblies for enabling the receiver to switch over for operation from either the battery pack accessory or a separate battery. When used in conjunction with the battery pack accessory and with the television receiver connected to an alternating-current power line, the batteries included in the battery pack accessory are automatically recharged whenever the television receiver is turned off.

It is an object of the invention to provide a new and improved power supply system for a portable television receiver.

It is another object of the invention to provide a new and improved power supply system whereby the television receiver may be operated from (1) an alternating-current power line, (2) from an attachable battery pack accessory or (3) from a separate battery with the system as a whole having a minimum of circuit complexity and providing the desired results at a relatively economical cost figure.

The present invention is particularly useful with portable television receivers of the transistor type.

For an understanding of the invention, reference is had to the following description taken in connection with the accompanying drawings, the scope of the invention being pointed out in the oppended claims.

Referring to the drawings.

Figure 1:
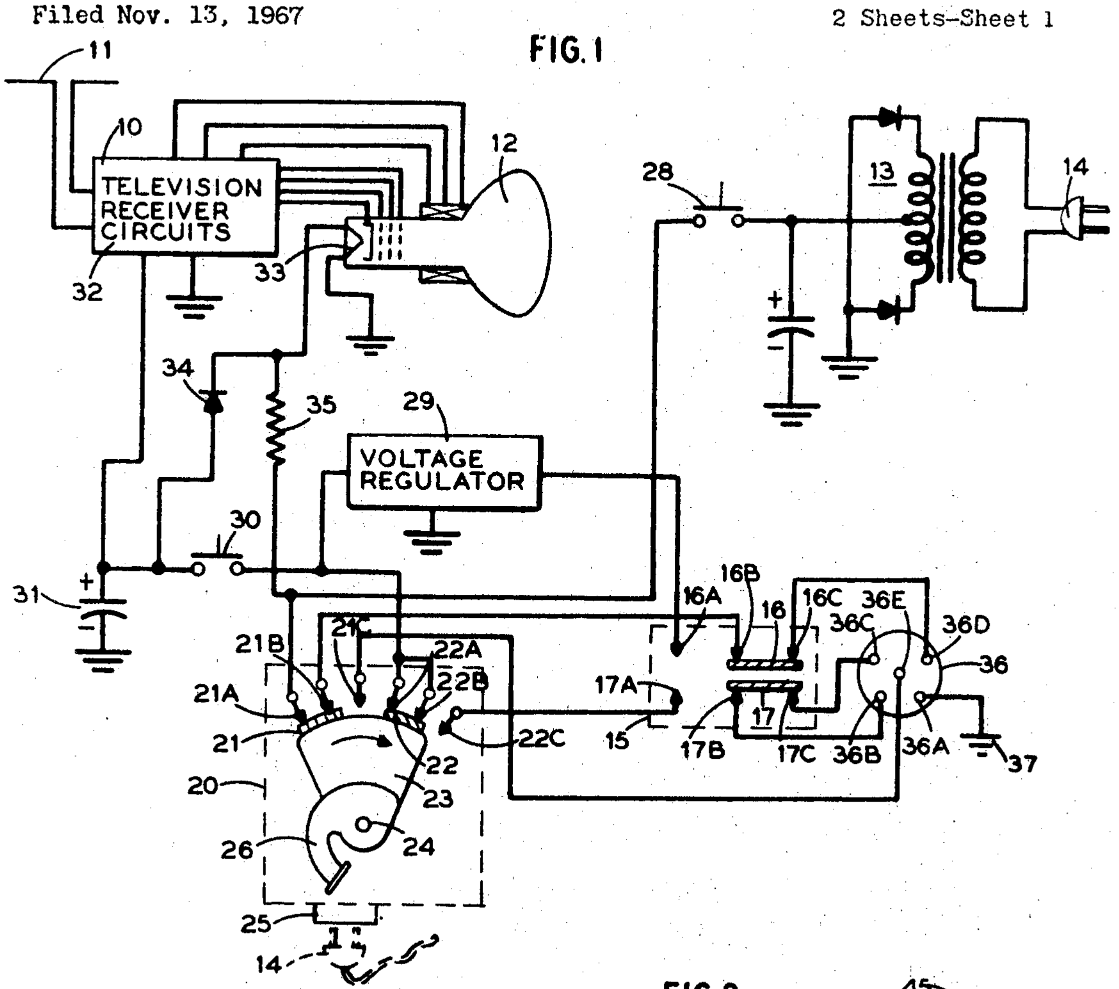
FIG. 1 illustrates in a schematic manner the television receiver proper, the power supply portion thereof being shown in detail.

The television receiver shown in FIG. 1 includes television receiver circuits 10 which are responsive to the radio-frequency signals picked up by an antenna system 11 for developing and supplying to a picture tube 12 the necessary operating signals for reproducing the transmitted television picture. The receiver also includes a rectifier circuit 13 which is adapted to be connected to an alternating-current power line by means of a power line plug 14.

The television receiver further includes a first switch assembly 15 which, among other things, functions as an on-off switch for the receiver. The switch assembly 15 is a slide type double-pole, double-throw switch. It includes a first slidable conductive switch member 16 which is adapted to make contact between different pairs of contact elements 16*a*, 16*b* and 16*c*. It also includes a second slidable conductive switch member 17 which is adapted to make connections between different pairs of contact elements 17*a*, 17*b* and 17*c*. Members 16 and 17 are mechanically ganged so that they move in unison with one another. The switch 15 position shown in the drawing is the "off" position for the television receiver, the other position being the "on" position.

The television receiver also includes a second switch assembly 20 which serves to switch the power supply system from alternating-current operation to direct-current operation. This switch assembly 20 is also a form of double-pole, double-throw switch. It includes a first conductive switch member 21 which is adapted to make connection between different pairs of contact elements 21*a*, 21*b* and 21*c*. It includes a second conductive switch member 22 which is adapted to make contact between different pairs of contact elements 22*a*, 22*b* and 22*c*. The switch members 21 and 22 are mounted on a movable nonconductive member 23 which can move or rotate with respect to a pivot point 24.

Switch assembly 20 is of the so-called "line cord switch" type. As such, it includes a receptacle 25 which is adapted to receive the power line plug 14. When such plug 14 is inserted into the receptacle 25, one prong of the plug 14 pushes up against an arm member 26 which is attached to the nonconductive member 23. This causes the member 23 to move from the illustrated left-hand position to the second or right-hand position, the latter being one contact element position to the right. The member 23 is spring biased so as to maintain it in the illustrated left-hand position when the plug 14 is not in the receptacle 25. Receptacle 25 is mounted on the back side of the television receiver chassis in an accessible location. In the position shown in the drawing, switch assembly 20 enables alternating-current operation of the receiver. The alternate position (when plug 14 is inserted into the receptacle 25) enables direct-current operation of the receiver.

During alternating-current operation, the rectifier circuit 13 produces an output voltage of +19 volts D.C. and is connected by way of a circuit breaker 28, switch assembly 20, switch assembly 15, a voltage regulator circuit 29 and a second circuit breaker 30 to a conductor 32 which runs to the direct-current supply voltage leads in the receiver circuits 10. A direct-current operating voltage of +12 volts is developed across capacitor 31. This operating voltage is also supplied to the filament 33 of the picture tube 12 by way of a diode 34 which is conductive when the receiver is turned on. When the receiver is turned off, the picture tube filament 33 is partially energized at approximately one-half its rated voltage by way of a resistor 35 which is connected directly to the output of the rectifier circuit 13. This preheats the filament 33 so that the picture tube 12 can reach a full brightness condition almost instantaneously when the receiver is turned on.

Figure 2:
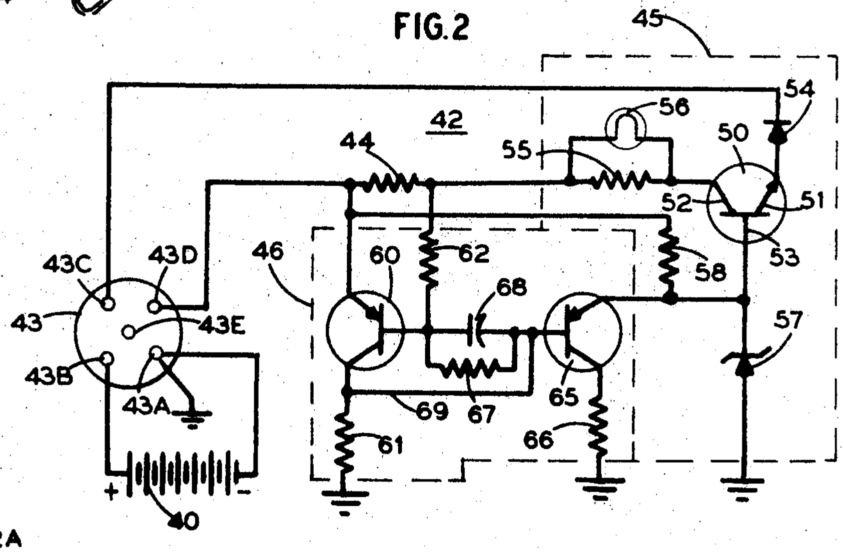
FIG. 2 shows the schematic circuit diagram for the battery pack accessory which may be attached to the FIG. 1 receiver.
Figure 3:
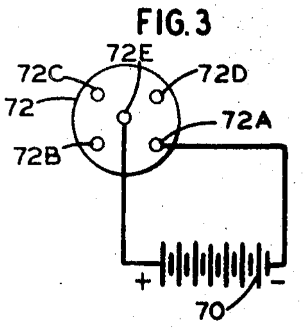
FIG. 3 shows the circuit for connecting a separate battery to the FIG. 1 receiver.

The television receiver also includes a male connector plug 36 mounted at an accessible location on the back side of the receiver chassis for enabling the receiver to be connected to either the battery pack accessory (FIG. 2) or a separate battery (FIG. 3). Plug 36 includes prong elements 36*a*–36*e*. Prong element 36*a* is connected directly to the chassis of the television receiver as indicated at 37, while the remainder of the prong elements are connected to the switch assemblies 15 and 20. In the drawing, the plug 36 is being viewed from the back side thereof, i.e., the side located inside of the receiver chassis housing.

FIG. 2 shows the battery pack accessory which is adapted to be mechanically attached to the cabinet of the television receiver of FIG. 1 and to be electrically interconnected with such receiver. The battery pack accessory includes a rechargeable battery (or batteries) 40 and a battery charging system 42. Battery 40 has a rated terminal voltage (when charged) corresponding to the desired operating voltage for receiver circuits 10, namely, twelve (12) volts. Battery 40 and charging system 42 are electrically interconnected with the television receiver by means of a female socket connector 43 having socket elements 43*a*–43*e*. Connector 43 is adapted to mate with the male connector plug 36 of FIG. 1, socket element 43*a* contacting prong element 36*a*, 43*b* contacting 36*b*, etc. The view shown in FIG. 2 is the front side of the connector 43.

The battery charging system 42 includes a resistor 44 and a variable impedance current regulating circuit 45 connected in series with one another and in series between the primary terminals of the battery charging system, such terminals being represented by the socket connector elements 43*c* and 43*d*. The system 42 also includes circuit means in the form of a start-stop circuit 46 which is connected to the resistor 44 and to the current regulating circuit 45 for rendering the current regulating circuit 45 nonconductive whenever the current flow through the resistor 44 falls below a predetermined value.

The current regulating circuit 45 includes a solid-state device in the form of an NPN transistor 50 having an emitter electrode 51, a collector electrode 52 and a control electrode or base electrode 53. The emitter electrode 51 is connected to the terminal 43*c* by way of diode 54. The collector electrode 52 is connected to the resistor 44 by way of a resistor 55 having a lamp 56 connected in parallel therewith. The base electrode 53 is connected to the chassis ground of the battery pack accessory by way of a 16-volt Zener diode 57. The base electrode 53 is also connected to the input terminal side of resistor 44 by means of a resistor 58.

The start-stop circuit 46 includes a first PNP type transistor 60 having its emitter connected to the primary terminal side of resistor 44 and its collector connected to the battery pack chassis ground by way of a resistor 61. The base electrode is connected to the other side of resistor 44 by way of a resistor 62. The start-stop circuit 46 further includes a second PNP type transistor 65 having its emitter connected to the base 53 of the current regulating transistor 50 and its collector connected to the battery pack chassis ground by way of a resistor 66. The base electrode of transistor 65 is connected to the base electrode of the transistor 60 by way of parallel connected resistor 67 and capacitor 68. The base electrode of transistor 65 is also connected to the collector resistor 61 of the transistor 60 by way of a conductor 69.

FIG. 3 shows an alternative manner of providing for direct-current operation of the FIG. 1 receiver. In this case, a separate battery (or batteries) 70 is connected by way of a female socket connector 72 to the FIG. 1 receiver, such connector 72 includes socket elements 72*a*–72*e* which individually contact the prong elements of the plug 36 having the corresponding suffix designations. A front view of the connector 72 is shown in FIG. 3. Battery 70 may be, for example, the 12-volt storage battery in an automobile.

As seen from the foregoing, the present power supply system provides for several different modes of operation. These different modes of operation, together with the use made of different ones of the circuit elements, are summarized in the following table.

| Receiver | Battery | Picture Tube Filament | Voltage Regulator |
|---|---|---|---|
| 1. Alternating-Current Operation [1] | | | |
| Off | Charged | Half volts | Not used. |
| On | Disconnected | Full volts | Used. |
| 2. Direct-Current Operation—Attached Battery Pack Accessory | | | |
| Off | Disconnected | Off | Not used. |
| On | Used | Full volts | Do. |
| 3. Direct-Current Operation—Separate Battery | | | |
| Off | Disconnected | Off | Not used. |
| On | Used | Full Volts | Used. |

[1] Plugged into alternating-current power line.

As seen from this table, the half-voltage preheating of the picture tube filament 33 is used only with the alternating-current mode of operation. It is not used with either of the direct-current modes of operation in order to conserve the battery charge. It is als seen that the voltage regulator 29 in the receiver is not used for direct-current operation with the battery pack accessory.

Figure 4:
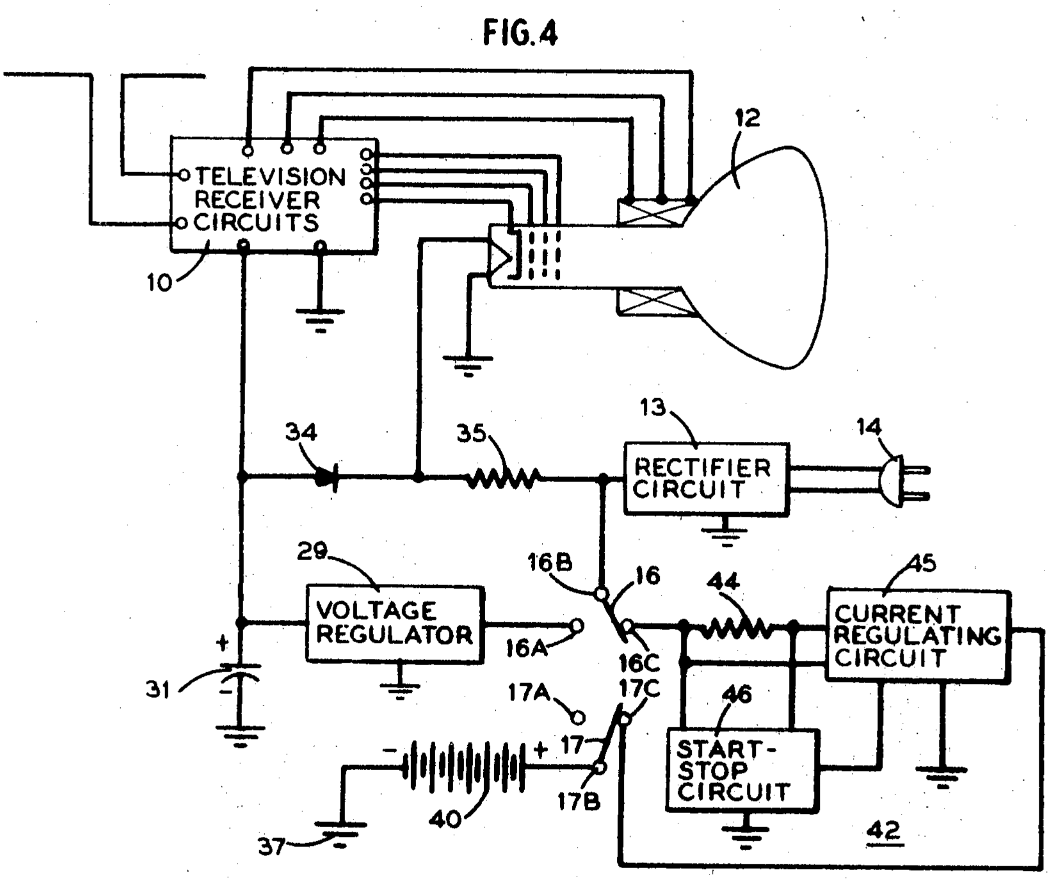
FIG. 4 shows in a simplified composite manner those portions of FIGS. 1 and 2 which are used when the receiver is being operated from an alternating-current power line.

FIG. 4 is a simplified composite illustration of FIGS. 1 and 2 for the case of alternating-current operation. The switch members 16 and 17 are shown in FIG. 4 in the positions they are in when the television receiver is turned off. In this case, the rectifier circuit 13 is connected in series with the battery 40 by means of the battery charging system 42. This enables recharging of the battery 40. The battery charging system 42 serves to decrease the charging current in a controlled manner as the battery 40 becomes charged, finally discontinuing the flow of charging current when full charge is reached. It also prevents overcharging of the battery 40.

When the television receiver is turned on, switch members 16 and 17 are switched to their left-hand contacts 16*a* and 17*a*. This switches the rectifier circuit 13 so that it is then connected by way of the voltage regulator 29 to the direct-current supply line for the receiver circuits 10. At this time, the battery charging system 42 and the battery 40 are disconnected.

Figure 5:
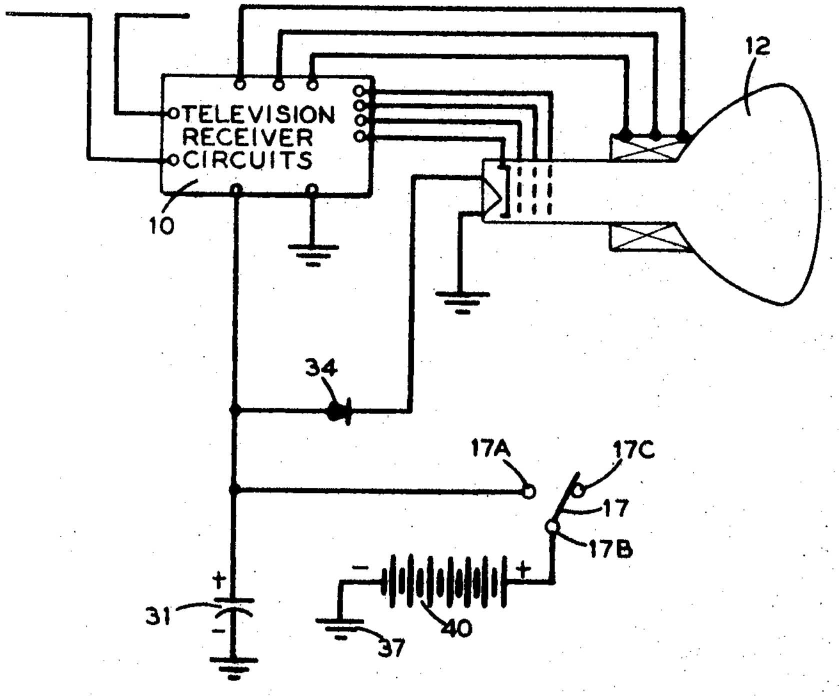
FIG. 5 shows in a simplified composite manner those portions of FIGS. 1 and 2 which are used when the receiver is being operated from the battery in the battery pack accessory.

FIG. 5 shows in a simplified composite manner the portions of FIGS. 1 and 2 which are used when the power supply system is set for direct-current operation from the battery pack accessory. This mode of operation is established by taking the power line plug 14 and inserting it into the line cord switch receptacle 25 in the manner indicated in outline form in FIG. 1. This sets the movable member 23 of the line cord switch 20 to its right-hand position. As indicated in FIG. 5, the rectifier circuit 13 is disconnected and effectively not present in this mode of operation. The only effective portion of the power supply system is the battery 40 which is connected by way of the on-off switch member 17 to the direct-current supply line of the television receiver circuits 10 when it is desired to turn the receiver on. This is accomplished by setting the switch member 17 so that it contacts the contact element 17*a*.

In order to operate the television receiver from a separate battery as indicated in FIG. 3, the socket connector for the battery pack accessory must be removed from the male connector plug 36 of the television receiver. The socket connector 72 associated with separate battery is then placed into engagement with the male connector plug 36. In order to complete this mode of operation, it is also necessary that the power line plug 14 be inserted into the receptacle 25 in the line cord switch assembly 20.

The operation of the battery charging system 42 shown in FIG. 2 will now be considered in greater detail. For this purpose it will be assumed that the battery pack socket connector 43 engages the receiver connector plug 36, the power line plug 14 is plugged into a 120-volt alternating-current outlet and that the on-off switch assembly 15 is in the off position (thus giving the situation depicted in FIG. 4). At this time, the rectifier circuit 13 applies a direct-current voltage of approximately +19 volts to the charging system primary terminal represented by socket element **43*d*. This causes charging current to flow through resistor 44, resistor 55 and lamp 56, through the transistor 50 from collector 52 to emitter 51, through the diode 54 to the second primary terminal 43*c*, through the switch member 17 (FIG. 1) to the socket element 43*b*, through the 12-volt battery 40 to the socket element 43*a* and then back through the prong element 36*a* (FIG. 1) to the chassis of the television receiver at ground point 37**.

An initial surge of current also flows by way of resistors 44 and 62, capacitor 68 and resistor 61. This initial surge provides sufficient current flow to bias the transistor 60 to a condition of maximum conduction (saturation). This produces a voltage drop across the resistor 61 which is supplied directly to the base electrode of transistor 65, thus placing the transistor 65 in a cutoff or nonconductive condition. Transistors 60 and 65 remain in these conditions until the charging action is completed.

Assuming that the battery 40 is fairly well discharged or depleted, then the base electrode 53 of the transistor 50 is initially at a considerably higher voltage level than is the emitter electrode 51. This turns on the transistor 50 fairly heavily. This enables a fairly heavy charging current to flow from collector 52 to emitter 51 in transistor 50 and through the diode 54 to the battery 40. With transistor 50 and diode 54 conducting, there is a voltage drop of about 0.7 volt across the base-to-emitter resistance of transistor 50 and a voltage drop of about 0.6 volt across the diode 54. As a result, the base electrode 53 of transistor 50 is at a voltage level which is 1.3 volts higher than the terminal voltage of battery 40. Assuming a battery terminal voltage of 11 volts at this time, this places the base electrode 53 at a level of +12.3 volts with respect to ground. Since the voltage applied to the charging system socket element **43*d* is +19 volts, then the resulting voltage difference across resistor 58 is 6.7 volts. This voltage difference provides the forward bias for the collector electrode 52** for maintaining the relatively heavy collector-to-emitter current flow.

The relatively heavy collector-to-emitter current flow through the transistor 50 produces a relatively large voltage drop across the resistor 55 and lamp 56 which, in turn, causes the lamp 56 to burn fairly brightly. In this condition, lamp 56 has a relatively high value of internal resistance. This lamp resistance, in combination with the resistance of resistor 55, limits the maximum battery charging current to a value of approximately 900 milliamperes.

As the battery 40 becomes charged the terminal voltage thereof increases. This increases the voltage level at the base electrode 53 of transistor 50 by a like amount. This decreases the voltage drop across the resistor 58, thus reducing the base-to-collector bias of the transistor 50. This, in turn, decreases the collector-to-emitter current flow through the transistor 50. In this manner, the collector-to-emitter impedance of the transistor 50 is increased and reduces the magnitude of the charging current.

When the voltage of battery 40 reaches a level of approximately 14.8 volts, the voltage at the base electrode 53 of the transistor 50 reaches a level of 16.1 volts. This 16.1-volt value corresponds to the firing potential of Zener diode 57 and hence causes the Zener diode 57 to conduct. This holds the base voltage of transistor 50 at the 16.1-volt level and prevents the battery 40 from being overcharged.

At the moment the Zener diode 57 begins to conduct, the battery charging current has been decreased to a value of about 200 milliamperes. Thereafter, the charging current will continue to decrease as the battery gradually acquires a full charge for the 14.8-volt voltage level which is then being maintained thereacross. A condition of full charge is indicated when the charging current reaches a value of about 50 milliamperes.

As the battery charging current decreases, the voltage drop across the parallel circuit of resistor 55 and lamp 56 decreases. This reduction in voltage level decreases the brightness of the lamp and lowers the lamp resistance. As the battery 40 approaches full charge, the lamp 56 will go out.

When the battery charging current falls below 50 milliamperes, the voltage drop across resistor 44 becomes too small to hold transistor 60 in saturation. As transistor 60 conducts less, its collector voltage decreases. This, in turn, causes transistor 65 to begin conducting. When transistor 65 begins to conduct, it turns off the battery charging current by lowering the voltage level at the base electrode 53 of transistor 50 to a value considerably below the voltage level at the emitter 51 of such transistor 50. This renders the transistor 50 nonconductive. This reduced voltage level at the base electrode 53 of transistor 50 also serves to cause the Zener diode 57 to stop conducting. The charging cycle is now completed.

In the use of the battery pack accessory with the television receiver, if any difficulty is encountered in getting the battery charging system 42 to commence operation when the receiver is turned off (indicated by the failure of lamp 56 to light up), then the television receiver should be turned on for a few seconds and then turned off rapidly. This will produce the necessary current surge through the capacitor 68 for purposes of turning on the transistor 60 and turning off the transistor 65, these things being necessary to start the battery charging action.

While it is not intended to limit the invention to any particular design constants, the following values have been found suitable for the battery charging system of FIG. 2 for the case where it is desired to charge a 12-volt battery from a direct-current source of approximately 19 volts:

Capacitor 68—2 microfarads
Diode 54—One ampere silicon
Diode 57—16.1 volt Zener
Lamp 56—#45
Resistor 44—2.2 ohms
Resistor 55—5 ohms
Resistor 58—270 ohms
Resistor 61—4700 ohms
Resistor 62—100 ohms
Resistor 66—180 ohms
Resistor 67—56,000 ohms
Transistor 50—type 40250
Transistor 60—type 2N2431
Transistor 65—type 2N2431

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A power supply system for a portable television receiver comprising:

a rectifier circuit adapted to be connected to an alternating-current power line for producing direct-current voltage;

battery means for producing direct-current voltage;

means for grounding one terminal of the battery means directly to the chassis of the television receiver;

battery charger circuit means;

first switch means for selectively connecting the rectifier circuit to either the battery charger circuit means or to the television receiver circuits;

second switch means for selectively connecting the ungrounded terminal of the battery means to either the battery charger circuit means or to the television receiver circuits;

and interconnecting means including third switch means connected intermediate the rectifier circuit and the first switch means and fourth switch means connected intermediate the second switch means and the television receiver circuits, the third and fourth switch means being ganged together to prevent the rectifier circuit from being connected to the television receiver circuits when the battery means is connected to the television receiver circuits and vice versa.

2. A battery charging system comprising:

a pair of primary terminals a first of which is adapted to be connected to a source of charging voltage and a second of which is adapted to be connected to a battery to be charged;

a charging current circuit comprising a resistor, a lamp, a diode and a transistor device having an emitter electrode, a collector electrode and a control electrode, the resistor and the lamp being connected in series between the first primary terminal and one of the collector and emitter electrodes, the diode being connected in series between the second primary terminal and the other of the collector and emitter electrodes;

a second resistor connected between the first primary terminal and the control electrode;

a Zener diode connected between the control electrode and a point of fixed reference potential;

and circuit means connected across the first-mentioned resistor and to the control electrode of the transistor device for rendering the transistor device nonconductive whenever the charging current through the first-mentioned resistor falls below a predetermined value.

References Cited

UNITED STATES PATENTS

| | | | |
|---|---|---|---|
| 3,209,230 | 9/1965 | Mas | 320—48 |
| 3,341,764 | 9/1967 | Kongable | 320—59 |
| 3,392,317 | 7/1968 | Eberts et al. | 320—23 |
| 3,430,059 | 2/1969 | Wolff | 307—66 |

J D MILLER, Primary Examiner

J. M. GUNTHER, Assistant Examiner

U.S. Cl. X.R.

307—66; 320—14, 23